UNITED STATES PATENT OFFICE.

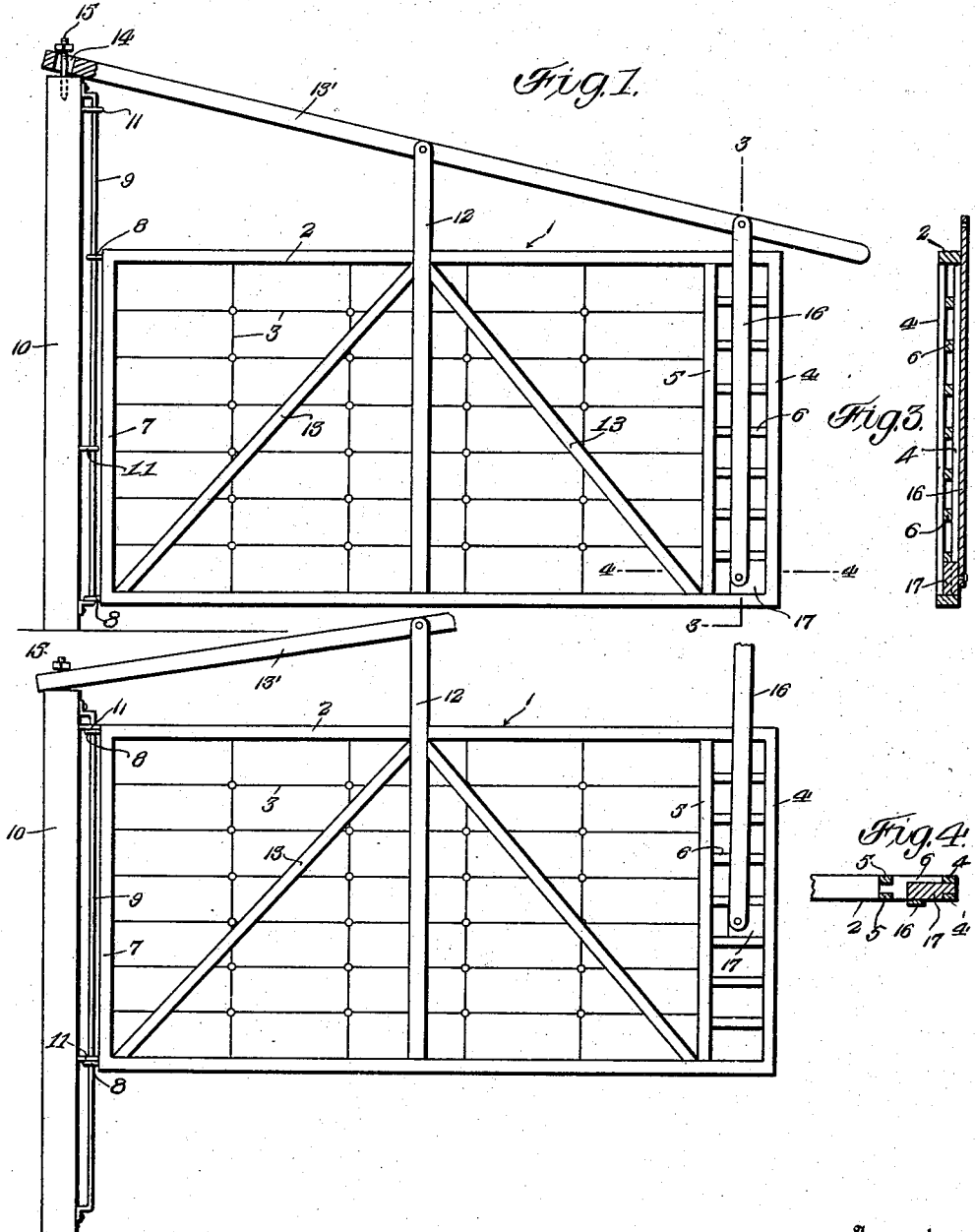

WALTER STANCHFIELD, FRANK BIXLER, AND HENRY BIXLER, OF BRUCE LAKE, INDIANA.

ADJUSTABLE GATE.

1,191,846.      Specification of Letters Patent.      Patented July 18, 1916.

Application filed June 23, 1915. Serial No. 35,970.

*To all whom it may concern:*

Be it known that we, WALTER STANCHFIELD, FRANK BIXLER, and HENRY BIXLER, citizens of the United States, residing at Bruce Lake, in the county of Fulton and State of Indiana, have invented new and useful Improvements in Adjustable Gates, of which the following is a specification.

This invention relates to an adjustable gate of improved construction adapted to provide an entrance to inclosures upon farms and the like.

The primary object of the invention has been to provide a gate of this character which is provided with means for adjusting the gate in a vertical direction, to permit stock contained in one inclosure to pass beneath the gate into the next inclosure and to provide means for raising the gate to a vertical position and for maintaining the gate in the said position.

A further object of the invention is to connect the means for raising the gate, with the gate and a post, to which the gate is attached in such a manner that the free end of the gate will be prevented from sagging.

A further object of the invention is to connect the means for raising the gate in a vertical direction, with the gate, in such a manner as to enable almost the entire weight of the gate to be supported at a point substantially intermediate the end of the gate, and thereby materially strengthen the same.

With these and other objects in view the invention resides in the improved construction, novel combination and arrangement of parts which will be hereinafter more fully described and particularly pointed out in the claims.

The preferred embodiment of the invention has been illustrated in the accompanying drawing, although no restriction is necessarily made to the precise details of construction therein shown, as changes, alterations and modifications within the scope of the claims may be resorted to when so desired.

In the drawing:—Figure 1 is a front elevation of the improved gate showing the same in normal position. Fig. 2 is a view similar to Fig. 1 showing the gate in a raised position. Fig. 3 is a vertical transverse section on the line 3—3 of Fig. 1. Fig. 4 is a transverse sectional view through one end of the gate on the line 4—4 of Fig. 1.

Like characters of reference denote corresponding parts throughout the several views in the drawing.

The numeral 1 designates a gate which may be formed of any suitable material and constructed in any suitable manner, although in this instance the gate comprises a frame 2 which has stretched between the side bars and end bars thereof a wire fabric 3. The spaced parallel bars 4 of the frame have spaced therefrom spaced, parallel and vertically extending bars 5 which are connected with the top and bottom bars of the frame. Extending transversely between the bars 5 and end bars 4 are vertically spaced bars 6, coöperating with the bars 5 and end bars 4 to form a framework adjacent one end of the gate, the purpose of which will hereinafter be more fully described. The remaining end bars 7 have projecting laterally therefrom eyes 8 through which is passed a rod 9, the ends of which are bent at a right angle and connected with one end of a post 10, and serve to space the rod 9 from the side of the post.

From the foregoing statements it can be clearly seen that the eyes 8 serve as a hinge connection for the end of the gate to which they are attached, and that the said eyes also permit vertical movement of the gate upon the rod 9. The post 10 is provided with spaced eyes 11 which encircle the rod 9 and limit the vertical movement of the gate through the contact of the eyes 8 on the end bars of the gate with the eyes on the post when the gate is moved in an upward direction sufficiently high to cause the eyes to engage.

A vertically extending bar 12 is secured to the gate intermediate the end bars 4 and 7, and has one end thereof extending upwardly a considerable distance above the upper side bar of the frame 2. The bar 12 is braced in the usual manner by means of struts 13, one end of which engages with the bar on the under side of the upper bar of the frame 2 while the remaining ends of the struts are disposed in opposite corners of the frame 2 formed by the bottom side bars and the vertical bars 5.

A lever 13′ is pivotally connected with the extended end of the bar 12 and has one of its ends slotted, as indicated by the numeral 14, and positioned upon the top of the post 10. A pin 15 is passed through the slotted end of the lever 13' and driven into the top of the post 10, the remaining end of the pin being threaded to receive means for preventing the disengagement of the slotted end of the lever with the pin. By adjusting this means upon the end of the pin, the swinging movement of the free end of the lever 13' may be regulated.

Pivotally connected with the lever 13' adjacent the free end thereof is a link 16, the remaining end thereof being provided with a weighted block 17, said block being pivotally connected with the link and having a reduced portion thereon for engagement between the spaced parallel bars 4 of the frame 2.

When it is desired to prevent the sagging of the end of the gate distant from the end of the gate connected with the rod 9, the block 17 is positioned in one of the spaces between the bars 6 in the framework adjacent the free end of the gate, and the reduced portion of the block inserted in the space between the spaced end bars 4, thus removably connecting the link with the free end of the gate. It will be noted with reference to Fig. 1 of the drawing, that when the link is connected with the end of the gate in the above mentioned manner, the weight of the gate is almost entirely supported by the bar 12 intermediate the end of the gate.

When it is desired to raise the gate in a vertical direction, sliding movement is imparted to the block 17 by means of the link 16, to remove the reduced end of the block from between the spaced end bars 4, to allow the block to be disengaged from the framework at the free end of the gate. The end of the lever containing the link 16 may now be manually operated in an upward direction to cause the gate to be drawn upwardly along the rod 9 by the bar 12; when the bottom of the gate has reached the height desired from the ground, the block 17 on the link 16 is again interposed in one of the spaces between the bars 6 in the framework, and the end of the block disposed between the spaced end bars 4, by means of the link 16 and in this manner the gate is maintained in an elevated position.

From the foregoing description taken in connection with the accompanying drawing it is apparent that an adjustable gate has been provided, which is simple in construction, inexpensive of manufacture and highly efficient in use.

Having thus described the invention, what is claimed as new is:—

1. In combination with a post, a lever connected with the post, a link connected with the lever distant from the post, a block pivotally connected with one end of the link, and a gate connected with the post for vertical movement and with the lever and having a frame work at one end formed from spaced bars providing adjusting compartments transversely of the gate for the reception of said block.

2. In combination with a post, a lever connected with the post, a gate connected with the post for vertical movement and with the lever and having a frame work formed from spaced horizontal bars and spaced vertical bars arranged at the ends of the spaced horizontal bars, a block adapted to be located between the spaced horizontal bars and provided with a reduced end, and a link having its respective terminals connected with the block and lever for inserting and withdrawing the reduced end of the block from between the spaced vertical bars in the frame work.

In testimony whereof we affix our signatures in presence of two witnesses.

WALTER STANCHFIELD.
FRANK BIXLER.
HENRY BIXLER.

Witnesses:
E. J. BUCHANAN,
W. H. GOHL.

Copies of this patent may be obtained for five cents each, by addressing the "Commissioner of Patents, Washington, D. C."